United States Patent [19]

Whitworth

[11] 3,835,541

[45] Sept. 17, 1974

[54] ELLIPSOID MARKER AND TEMPLATE TRACER

[76] Inventor: Loraine T. Whitworth, 5024 Sunkist Pl., Tucson, Ariz. 85706

[22] Filed: May 21, 1973

[21] Appl. No.: 362,109

[52] U.S. Cl. ............... 33/21 C, 266/23 N, 266/23 L
[51] Int. Cl..... B23k 37/00, B43l 11/00, B23k 33/00
[58] Field of Search ...... 33/21 C, 21 R, 30 R, 30 B, 33/30 C, 30 D, 30 F, 30 G; 266/23 E, 23 L, 23 N, 23 NN

[56] References Cited
UNITED STATES PATENTS

| | | | |
|---|---|---|---|
| 1,991,117 | 2/1935 | Porteous et al. | 33/30 F |
| 2,832,139 | 4/1958 | Ayres | 33/21 C |
| 2,878,010 | 3/1959 | Cink | 266/23 N |

FOREIGN PATENTS OR APPLICATIONS

| | | | |
|---|---|---|---|
| 10,584 | 6/1963 | Japan | 33/21 C |

Primary Examiner—Louis R. Prince
Assistant Examiner—John W. Shepperd
Attorney, Agent, or Firm—Cahill, Sutton & Thomas

[57] ABSTRACT

A device for determining the apertures to be cut when mating two pipes is disclosed. The device is attached to a first one of the pipes and a pointer is angularly and positionally aligned with the center of the desired pipe junction. A first marking element is rotated about the pointer at a radius corresponding to the internal radius of a second one of the pipes to mark the aperture to be formed in the first pipe. The second pipe or a replica thereof is secured by a clamp, and aligned with the pointer. A second marking element is rotated about the second pipe to mark the end cut of the second pipe. If it is not feasible to mount the second pipe, the replica, wrapped with a sheet of paper, is mounted in its place. The sheet, after being scribed by the second marking element, is used as a template to define the end cut of the second pipe. The device also includes provisions for accommodating various junction angles and pipe sizes.

9 Claims, 7 Drawing Figures

3,835,541

ELLIPSOID MARKER AND TEMPLATE TRACER

The present invention relates to pipe fitters tools, and more particularly, to a tool for marking pipes.

When two pipes are to be laterally connected to one another each of the pipes must be specially cut to provide a good seal. The size and nature of each cut is primarily dependent upon the relative pipe diameters and the angle between the two pipes. Other considerations such as the pipe wall thickness are also present. The standard solution for determining the lines of the respective cuts is that of making templates in accordance with well known graphical principles. A full description of this procedure can be found in almost any pipe fitters handbook. Necessarily, the process is tedious and not readily adaptable for on-site use without extensive drafting implements. It is therefore time consuming and laborious though the resulting templates are accurate.

To minimize the total time necessary in laying out the cuts, several mechanical scribing devices have been developed. These scribing devices provide a means for directly marking the cut to be made on each pipe. In example, U.S. Pat. No. 1,991,117, shows a device for scribing a pipe. U.S. Pat. No. 2,878,010, teaches a device for making an end cut on one pipe to match the surface configuration of another pipe. U.S. Pat. No. 2,832,139, discloses a marking device wherein the external diameter of one pipe is used as a guide for marking a second pipe. Either of United States patents such as Nos. 2,436,542; 2,497,853; 2,844,874; and 3,238,623 further illustrate other devices employed for marking the respective junction point of two or more pipes.

However, none of the above enumerated devices are capable of marking all of the pipes to be joined without re-locating the device nor are they also capable of drawing templates of the cuts to be made in each of the pipes.

It is therefore a primary object of the present invention to provide a device for marking the cuts to be made in each of the pipes to be joined to one another.

Another object of the present invention is to provide a single simple to operate device for marking pipes.

Yet another object of the present invention is to provide a device for producing full scale pipe templates.

Still another object of the present invention is to provide apparatus for determining the coordinates for a pipe cut template.

A further object of the present invention is to provide a pipe marking device useable on-site.

A yet further object of the present invention is to provide a pipe marking device selectively keyed to the internal or external radius of the pipe.

A still further object of the present invention is to provide a pipe marking device useable at any angle at which two or more pipes are to be joined.

These and other objects of the present invention will become apparent to those skilled in the art as the description thereof proceeds.

The present invention may be described with more specificity and clarity with reference to the following figures, in which.

Figure 1:
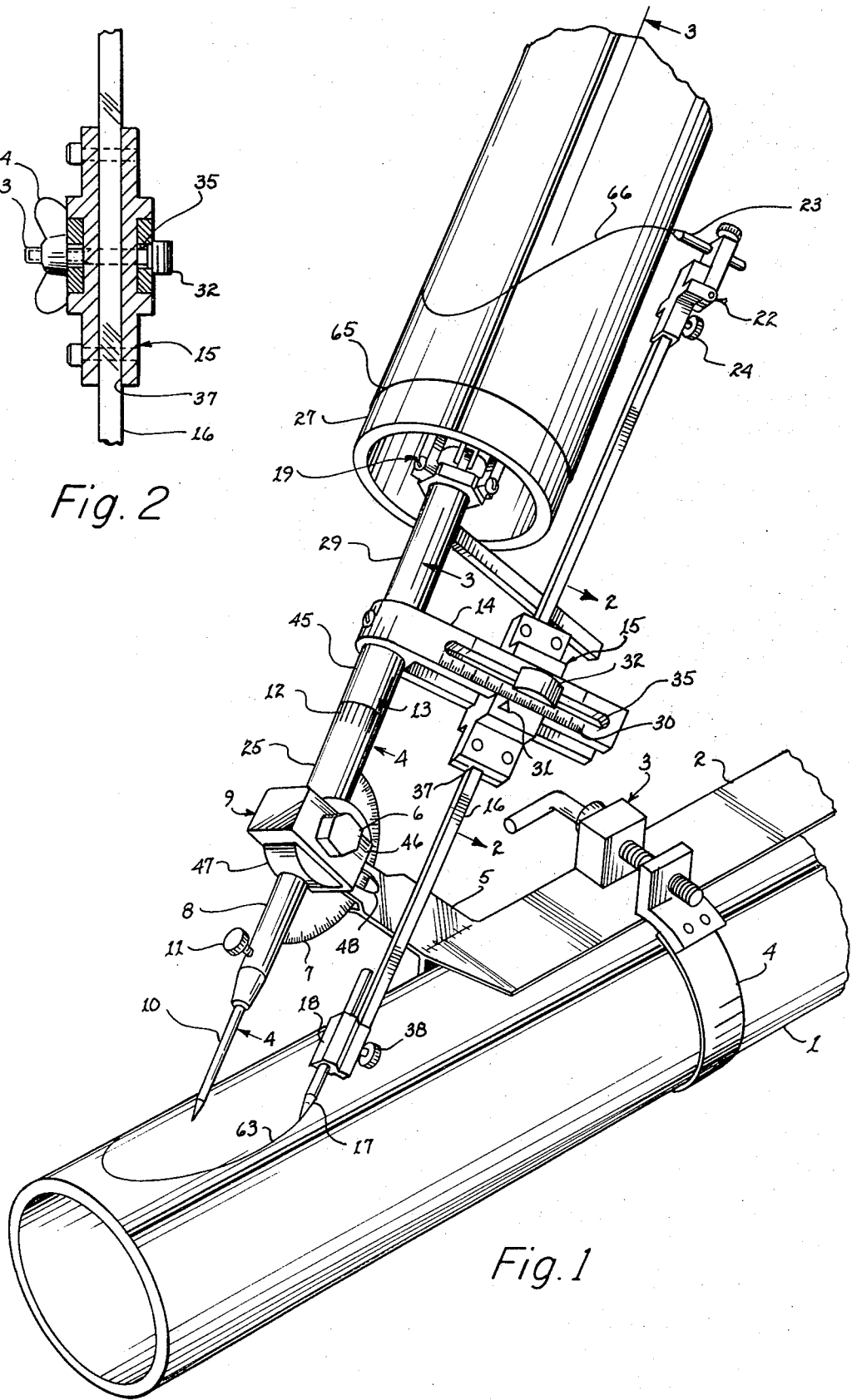
FIG. 1 illustrates a perspective view of the present invention.

Referring to FIG. 1, there is shown a pipe 1 which is to have a lateral pipe 27 connected thereto at a specified angle and location. By using the present invention, as described below, it will be possible to determine both the configuration of the aperture within pipe 1 and the mating end cut in pipe 27. A base 2, which base may be in the form of an angle iron is positioned atop pipe 1. Base 2 is secured to pipe 1 by a band 4 encircling the pipe and cooperating with a clamp mechanism 3. An arm 5 extends upwardly from base 2 at an angle of approximately 45°. An assembly 9, positioned at the extremity of arm 5, supports the marking apparatus of the present invention.

Figure 4:
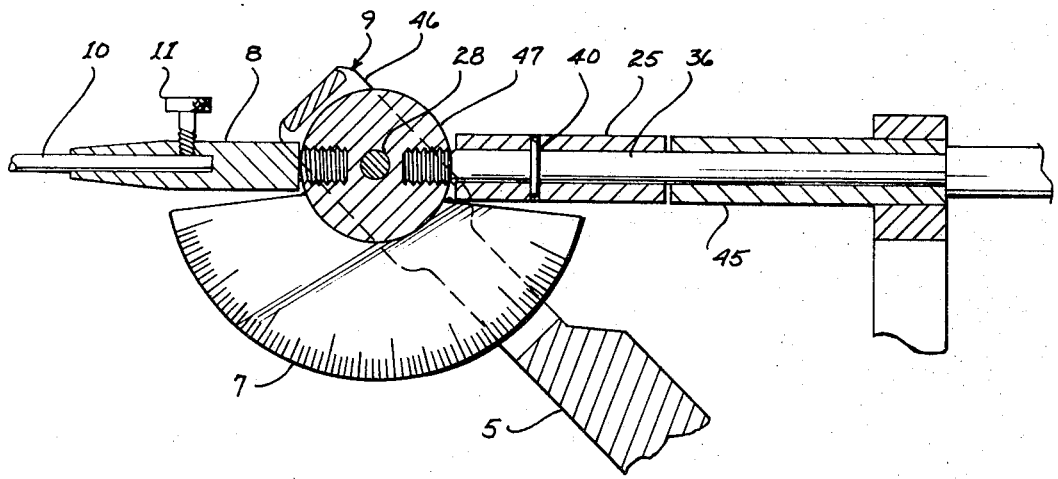
FIG. 4 illustrates a cross-sectional view of the junction between the base and the operating mechanism assembly taken along lines 4—4, as shown in FIG. 1.

Referring jointly to FIGS. 1 and 4, assembly 9 and its operation will be described in further detail. Arm 5 terminates in housing 46. A cylindrical member 47 is journalled within housing 46 by shaft 28 of head bolt 6. A nut, not shown, secured to the threaded end of head bolt 6 maintains shaft 28 in place. A protractor 7 is fixedly secured to the lower part of cylindrical member 47 such that any rotational movement of the cylindrical member is reflected in an angular movement of the protractor. The extremity of arm 5 is split to accommodate movement of protractor 7 therebetween. A window 48 disposed within at least one of the split extremities of arm 5 provides a visual access to the angular gradations found on protractor 7. Thus, cylindrical member 47 may be angularly positioned with respect to arm 5. In the preferred embodiment, the angular gradation of protractor 7 corresponding to a reference line in window 48 is determinative of the angular relationship between cylindrical member 47 and the plane represented by base 2.

Still referring to FIGS. 1 and 4, cylindrical member 47 includes a threaded cavity for receiving the threaded end of stabilizer 8. The opposite end of stabilizer 8 includes a cavity for receiving the end of pointer 10. A thumb screw 11 threadedly engaging stabilizer 8 retains pointer 10 within stabilizer 8. A second threaded cavity is disposed within cylindrical member 47 diametrically opposite to the first threaded cavity. The threaded end of shaft 36 engages the second threaded cavity.

A collar 25 is fitted about shaft 36 and retained in place adjacent cylindrical member 47 by pin 40 extending through collar 25 and shaft 36. The sleeve 45 is rotatably mounted upon shaft 36 adjacent the collar 25 and held in place by a further collar 29.

As shown in FIG. 1, a plurality of indicia 12 are disposed about the upper end of collar 25. There are sixteen such indices equally spaced about the collar. Each of these indicia respresent one point along the X axis normally used to form a pipe template. An arrow 13 is disposed at the lower extremity of sleeve 45 to indicate the rotational relationship between sleeve 45 and indicia on collar 25.

Figure 2:
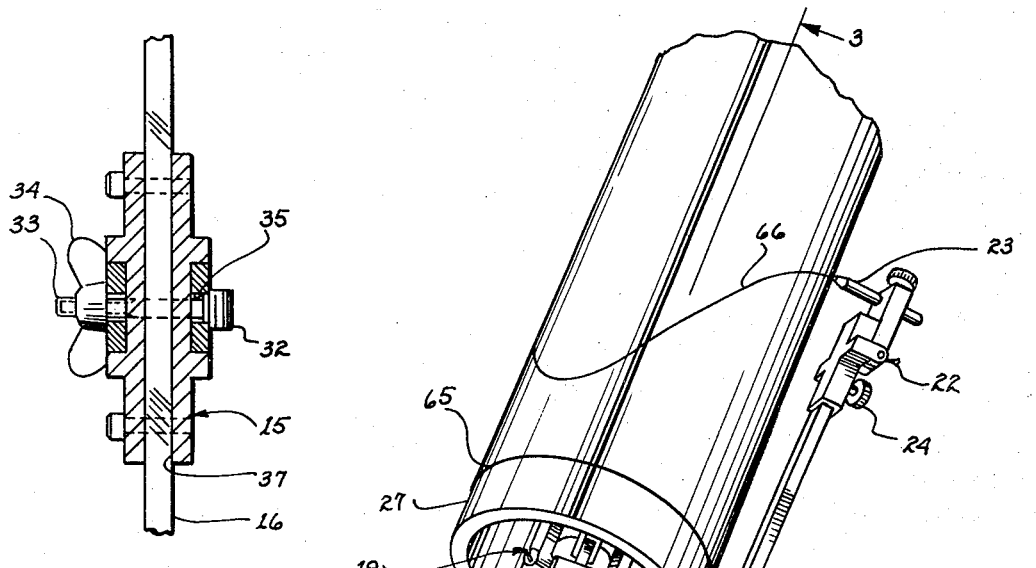
FIG. 2 illustrates a cross-sectional view of the bearing cage taken along lines 2—2, as shown in FIG. 1.

A yoke 14 is fixedly attached to sleeve 45 to prevent independent rotational movement therebetween. Each of the arms of the yoke 14 includes corresponding slots, of which slot 35 is shown. Adjacent slot 35 there are disposed a plurality of calibrations 30. Calibrations 30 correspond to the radial distance along the yoke 14 from the axis of shaft 36. As shaft 36, stabilizer 38, and pointer 10 are axially aligned with one another, calibrations 30, perforce, represent the radial distance from the axis of pointer 10. A bearing cage 15 is disposed intermediate the arms of yoke 14. As shown in FIG. 2, retainer 32 extends through slot 35 to guide bearing cage 15. A thumb screw 34 may be secured to the lower extremity 33 of retainer 32 to firmly locate bearing cage 15 at a predetermined position on yoke 14. An arrow 31 disposed upon bearing cage 15 serves as an indication of the position of a reference line with respect to the axis of shaft 36.

Bearing cage 15 includes a longitudinally disposed cavity 37 for receiving marker bar 16 (see also FIG. 2). The lower extremity of marker bar 16 includes a pencil holder 18 for securing a pencil 17 therein. A thumb screw 38 may be used to secure the pencil holder to the end of marker bar 16.

Figure 5:
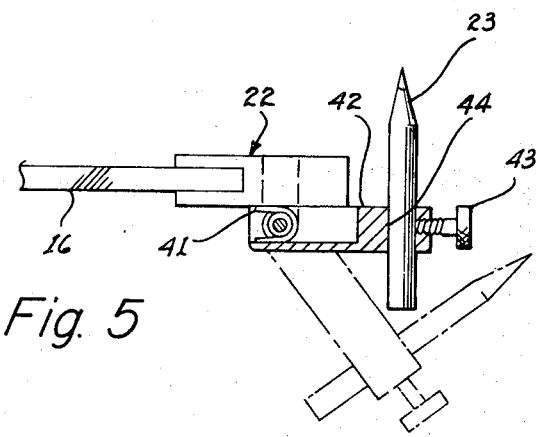
FIG. 5 illustrates the spring biased template marking element.

Referring jointly to FIGS. 1 and 5, there is shown a pencil holder 22 secured to the upper end of marker bar 16 by means of a thumb screw 24. Pencil holder 22 includes a coil spring 41 pivotally biasing a holder 42. Holder 42 includes a cavity 44 for receiving a pencil 23 and a thumb screw 43 for securing the pencil within the cavity. Coil spring 41 permits holder 42 to be angularly displaced with respect to marker bar 16.

Figure 3:
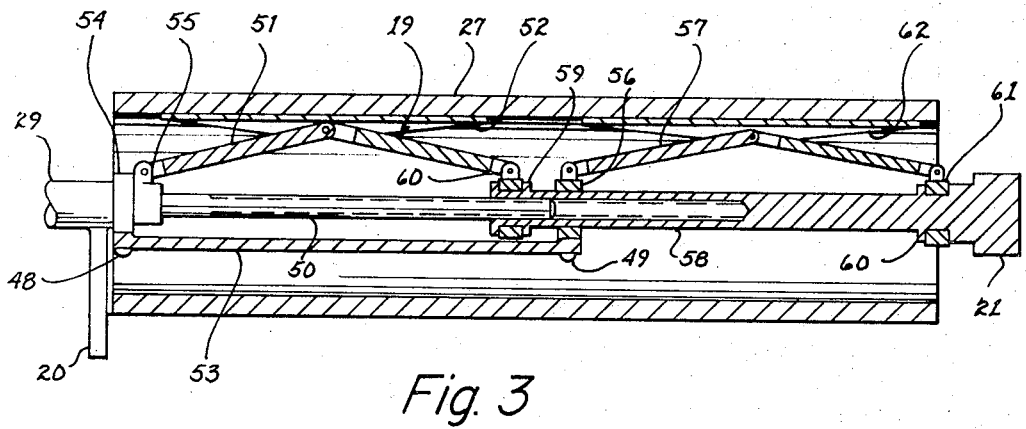
FIG. 3 illustrates a cross-sectional view of the expanding chuck mechanism taken along lines 3—3, as shown in FIG. 1.

Pipe 27 is axially mounted with respect to pointer 10 by means of an expanding chuck 19, as shown in FIG. 1. The apparatus of chuck 19 will be explained with particular reference to FIG. 3. A threaded rod 50, which rod may be a part of shaft 36 or an extension thereof, extends upwardly from collar 29. A nut 54 is threaded onto rod 50 in abutting relationship with the end of collar 29. An internally threaded sleeve 58 is threaded onto rod 50 and includes a chuck knob 21 disposed at one end thereof. Nut 54 includes a plurality of ears 48 extending therefrom. A yoke 56 slideably engages sleeve 58 and also includes a plurality of ears 49. Each of several spacers 53 are secured to respective ones of ears 48 and 49 to maintain yoke 56 at a fixed axial distance from nut 54. A further yoke 55 threadedly engages rod 50 and is positioned adjacent nut 54 in a locking relationship. Sleeve 58 includes a first annular channel 59 disposed at its inner extremity. A yoke 60 is disposed within channel 59 and is freely rotatable with respect thereto. A second annular channel 60 is disposed about sleeve 58 adjacent knob 21. A yoke 61 is disposed within channel 60 in sliding rotational engagement with respect thereto. A first set of articulated arms 51 are connected intermediate yoke 55 and yoke 60. A shoe 52 is pivotally connected to each of the articulated arms 51. A second set of articulated arms 57 is connected intermediate yoke 56 and yoke 61. A shoe 52 is pivotally connected to each of the articulated arms 57.

From the above description, it will be apparent that as knob 21 is rotated, sleeve 58 is axially displaced with respect to rod 50. The axial displacement of sleeve 58 causes yokes 55 and 60 to move toward or away from each other. Similarly, axial displacement of sleeve 58 will cause yokes 56 and 61 to be displaced toward or away from each other. Any change in displacement between yokes 55 and 60 and yokes 56 and 61 will cause the respective shoes 52 and 62 to be radially repositioned with respect to the axis of rod 50.

In operation, pipe 27 is slid onto expandable chuck 19 when the latter is in its retracted position until the pipe contacts stop gauge 20 extending from collar 29. By turning knob 21, shoes 52 and 62 are radially displaced until they engage the inner surface of pipe 27. On engagement, pipe 27 will be axially positioned with respect to the axis of rod 50.

Figure 6:
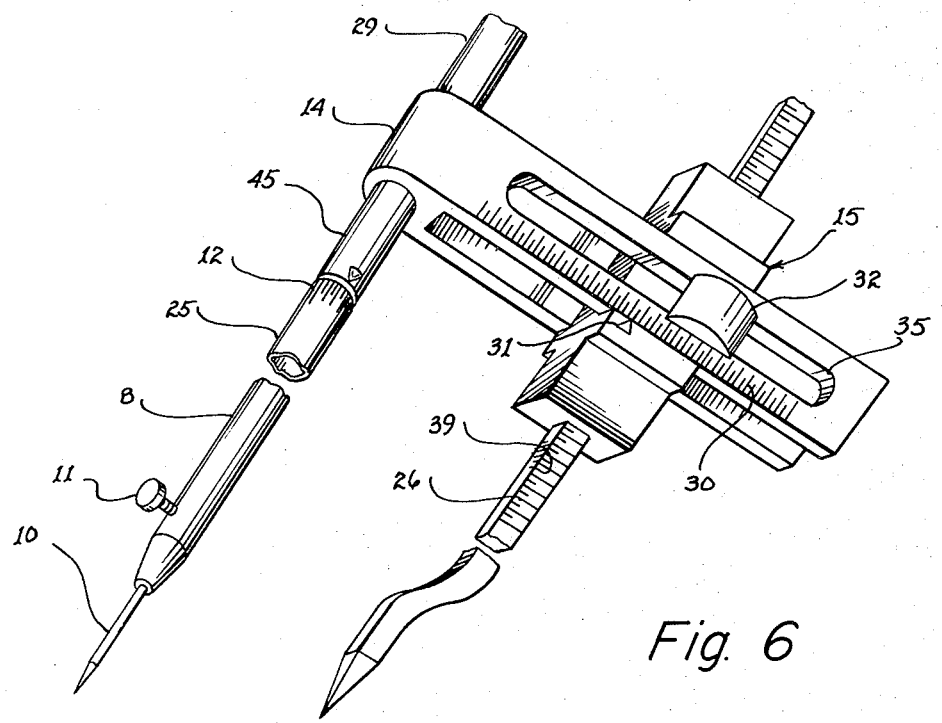
FIG. 6 illustrates the rotatable yoke supporting a marking element for a measuring bar.

If a template is to be made, which template corresponds to the aperture to be formed within pipe 1, the calibrated measuring bar 26 is used in place of marker bar 16 (See FIGS. 1 and 6). The graduations 39 placed upon one face of bar 26 are representative of fractions of an inch (or metric). These points, when used in combination with the indicia on collar 25, represent points along the Y axis for a pipe cut template. The readout of the graduations 39 may be made at the top edge of bearing cage 15. Alternatively, a curved arrow may extend from bearing cage 15 with the point being adjacent the graduations. The exact measurement obtained is unimportant as it is the relative relationship between a plurality of successive measurements which are necessary to form the template.

The operation of the present invention will be described below. It will be assumed that a pipe (pipe 27) is to be joined to a larger pipe (pipe 1) at an angle of 45°. The center of the junction is marked upon pipe 1 by a tool such as a center punch. The stabilizer bar 8 is set at the 45° angle by loosening the nut on head bolt 6 to permit the stabilizer bar to rotate with respect to arm 6 until the 45° mark appears adjacent the reference line in window 48. The head bolt 6 is then tightened. The tool is attached to pipe 1 by positioning base 2 upon the pipe at such a location that the tip of pointer 10 is adjacent the marked junction center. Clamp mechanism is tightened to secure base 2 to pipe 1. In some cases, it may be necessary to loosen thumb screw 11 to extend or retract pointer 10. Thumb nut 34 associated with retainer 32 is loosened to permit bearing cage 15 to be moved relative to yoke 14 until arrow 31 is adjacent the calibration 30 corresponding to the internal diameter of pipe 27. The marker bar 16, being in slideable engagement with bearing cage 15 permits an operator to position the point of pencil 17 upon the surface of pipe 1. By swinging yoke 14 about shaft 36, the movement of pencil 17 will describe a circle about pointer 10 in an axis perpendicular to pointer 10. Simultaneously, point of pencil 17 will trace an ellipsoid line (line 63) upon the surface of pipe 1. As yoke 14 is rotated, the operator applies a sufficient downward force upon pencil holder 18 or pencil 17 to maintain the pencil in continuous contact with pipe 1 and thus form line 63. From experience, it has been found that line 63 is most easily drawn by drawing the ellipsoid as a series of quadrants beginning at the high point (center) of pipe 1 and terminating at the low point (the side) of the pipe. The formed line 63 represents the cut to be made within pipe 1 to receive the end of pipe 27.

The marking for the end cut of pipe 27 is made with the aid of pencil 23 secured within holder 22 at the upper extremity of marker bar 16. If the pipe to be joined to pipe 1 is of convenient length, it may be directly mounted upon expandable chuck 19. Usually such is not the case and a replica is mounted upon the expandable chuck. In addition, a sheet of paper 65 is wrapped about pipe 27. It is usually most expeditious to index the longitudinal edge of paper 65 at the location adjacent pencil 23 where arrow 13 corresponds with the first of gradations 12. This point coincides with the position of marker bar 16 being centrally adjacent arm 5.

Figure 7:
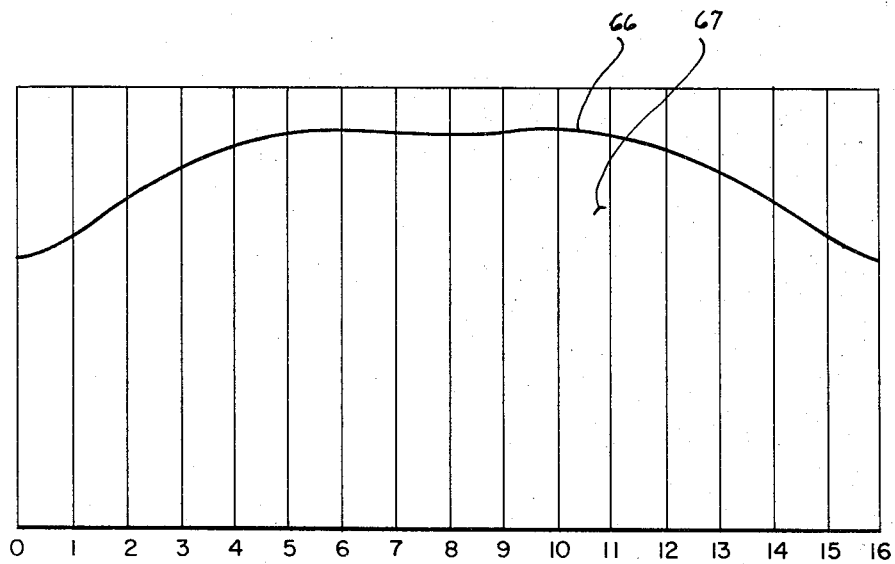
FIG. 7 illustrates a template formable with the present invention.

As pipe 27 cannot be directly marked, a template is formed from paper 65 wrapped about the replica. The template is formed in the following manner. At station 1 of gradations 12, a mark is made upon paper 65 by pencil 23. Yoke 14 is rotated about shaft 36 until arrow 13 matches with station 2. A second point is then made upon paper 65 by pencil 23. Simultaneously, pencil 17 is traced upon the surface of pipe 1, which action causes pencil 23 to be repositioned along the axis of bar 16 as well as simultaneously being laterally displaced along the surface of paper 65. This procedure is continued until pencil 17 has traced the ellipsoid disposed upon pipe 1. The resulting line 66 represents the end cut to be made on the paper 65. Referring to FIG. 7, there is shown a template 67 formed by the above described method. Each of the stations along the X axis represents one of the lines forming gradations 12. The Y axis coordinates are formed by the axial movement of bar 16 as pencil 17 traces line 63 upon pipe 1, Paper 65 is thence removed from about pipe 27 and cut along line 66. The resulting piece is the template to be used in marking the cut at the end of pipe 27.

From the above description, it may be appreciated that the present invention permits the marking of each of the pipes to be joined with a minimum amount of effort and time. Thus, it is not necessary for the pipe fitter to engage in the extensive drafting techniques normally employed.

If a template of the ellipsoid, represented by line 63 on pipe 1, is to be made, marker bar 16 is replaced with calibrated measuring bar 26. Bar 26 is swung about pointer 10 in the same manner as described above with respect to bar 16. At each of the stations, represented by gradations 12 mating with arrow 13, a reading is taken of the graduation 39 adjacent the reference point on bearing cage 15. By making a table of readings corresponding to each of the stations (graduation 12) the operator can easily draw his template. In drawing the template, the stations are marked along the X axis with the corresponding readings marked along the Y axis. Thus, it may be readily understood that the present invention permits a pipe fitter to make templates of each of the cuts to be made in the to be joined pipes. Further, the angle of the junction can be accommodated by simply varying the position of protractor 7 with respect to the reference line in window 48. The size of pipe 1 is only limited by the size of the particular clamp mechanism being used. The size of the pipe 27 is limited only by the expandability of expanding chuck 19 and the length of the arms of yoke 14. It is further possible to adjust the present invention such that the cuts are made to conform with either the inner or the outer walls of pipe 27.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. A device for determining the cuts to be made in each of a plurality of pipes to be joined to one another, said device comprising, in combination:
   a. attachment means for detachable securing said device to a first one of the plurality of pipes;
   b. an arm extending from said attachment means lateral to the first pipe;
   c. a shaft pivotally mounted within said arm;
   d. means for aligning the axis of said shaft with the axis of a second one of the plurality of pipes to be joined to the first pipe;
   e. a pointer extending from said shaft, said pointer being axially positionable to contact the surface of the first pipe at the center of the junction of the plurality of pipes;
   f. a yoke rotatably mounted upon said shaft, said yoke including indicia representative of the radius of the second pipe;
   g. a bearing cage mounted on said yoke, said bearing cage being fixable at varying distances along said yoke representative of the radius of the second pipe;
   h. a bar longitudinally slideable through said bearing cage, and movable about said shaft while maintaining said bar parallel to said shaft;
   i. marking means secured to said bar for tracing a line upon the surface of the first pipe about said pointer as said bar is rotated about said shaft; and
   j. indication means forming a part of said bar for indicating a series of axial displacements of said bar relative to said bearing case as said bar is rotated about said shaft; whereby said marking means traces a line upon the surface of the first pipe which line corresponds to the cut to be made in the first pipe, and the series of displacements of said bar with respect to the rotational position of said bar is representative of the cut to be made in the second pipe.

2. The combination as set forth in claim 1 wherein said aligning means includes a protractor affixed to said shaft and a reference point disposed upon said arm, said reference point being coincident with the angular gradations of said protractor.

3. The combination as set forth in claim 2, including a sleeve disposed intermediate said yoke and said shaft to permit rotation of said yoke with respect to said shaft.

4. The combination as set forth in claim 3 further including:
   a. a collar secured to said shaft adjacent said sleeve;
   b. a plurality of indicia uniformly disposed about the periphery of said collar adjacent said sleeve; and
   c. a reference mark disposed upon said sleeve, said reference mark being selectively coincident with each of said indicia.

5. The combination as set forth in claim 4 wherein said indication means comprises a plurality of gradations located on said bar and said bearing cage includes a reference point positioned adjacent the gradations of said bar; whereby, the axial displacement of said bar in response to movement of said marking means about the surface of the first pipe can be determined with respect to each of the indicia disposed upon said collar.

6. The combination as set forth in claim 1 including:
  a. an expandable chuck axially aligned with said shaft for mounting the second pipe; and
  b. a writing element secured to said bar for marking the surface of the second pipe mounted on said chuck in response to rotation of said bar about said shaft; whereby, the cuts to be made in each of the first and second pipes can be traced simultaneously.

7. The combination as set forth in claim 6 wherein said writing element is biased toward the surface of the second pipe to ensure contact therebetween.

8. The combination as set forth in claim 7 wherein said marking means comprises a point at the end of said bar.

9. The combination as set forth in claim 7 including a piece of paper disposed about the second pipe; whereby, the marking made by said writing element on said piece of paper can be used to form a template for the cut of the second pipe.

* * * * *